United States Patent
Fujino et al.

(10) Patent No.: US 7,886,586 B2
(45) Date of Patent: Feb. 15, 2011

(54) ABNORMALITY DETECTION DEVICE OF FUEL PUMP

(75) Inventors: Kenichi Fujino, Shizuoka (JP); Shigeyuki Ozawa, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 76 days.

(21) Appl. No.: 12/247,278

(22) Filed: Oct. 8, 2008

(65) Prior Publication Data

US 2009/0095061 A1    Apr. 16, 2009

(30) Foreign Application Priority Data

Oct. 11, 2007    (JP)    ............... 2007-265217

(51) Int. Cl.
    *G01R 27/02*    (2006.01)
(52) U.S. Cl. .................................. 73/114.41
(58) Field of Classification Search ............... 73/114.41
    See application file for complete search history.

(56) References Cited

U.S. PATENT DOCUMENTS

| | | | |
|---|---|---|---|
| 5,241,933 A * | 9/1993 | Morikawa | 123/198 D |
| 5,313,923 A * | 5/1994 | Takeuchi et al. | 123/497 |
| 6,015,321 A * | 1/2000 | Ozawa et al. | 440/88 R |
| 6,609,501 B2 * | 8/2003 | Doane et al. | 123/458 |
| 6,744,609 B2 * | 6/2004 | Hiwatari et al. | 361/24 |
| 6,820,470 B2 * | 11/2004 | Shidara et al. | 73/114.37 |
| 6,864,806 B2 * | 3/2005 | Funayose et al. | 340/984 |
| 6,907,775 B2 * | 6/2005 | Hosoya | 73/114.41 |
| 6,908,289 B2 * | 6/2005 | Scanderbeg et al. | 417/32 |
| 7,182,656 B2 * | 2/2007 | Nanami et al. | 440/1 |
| 2001/0019470 A1 * | 9/2001 | Hiwatari et al. | 361/33 |
| 2002/0023627 A1 * | 2/2002 | Nakase et al. | 123/516 |
| 2003/0106366 A1 * | 6/2003 | Shidara et al. | 73/118.2 |
| 2004/0266284 A1 * | 12/2004 | Iida et al. | 440/84 |

FOREIGN PATENT DOCUMENTS

JP    2002-161800 A    6/2002

OTHER PUBLICATIONS

Fujino et al.; "Water Jet Propulsion Boat"; U.S. Appl. No. 12/247,276, filed Oct. 8, 2008.

* cited by examiner

*Primary Examiner*—Freddie Kirkland, III
(74) *Attorney, Agent, or Firm*—Keating & Bennett, LLP (57) ABSTRACT

An abnormality detection device of a fuel pump reduces costs and prevents detection error or breakdown by making the fuel pressure sensor unnecessary. The abnormality detection device includes an abnormality detection circuit, a fuel pump driving voltage detection unit to detect the voltage value of an abnormality detection circuit, and a meter. The abnormality detection circuit is constituted by the circuit including a resistance disposed between a battery side of the fuel pump motor to drive the fuel pump and a ground side. If the voltage value detected by the fuel pump driving voltage detection unit is larger than the upper limit or lower than the lower limit of the normal range, the warning lamp of the meter flashes and a buzzer makes an alarm sound. The abnormality detection circuit is housed in the fuel pump module disposed in the fuel tank.

3 Claims, 8 Drawing Sheets

ABNORMALITY DETECTION DEVICE OF FUEL PUMP

BACKGROUND OF THE INVENTION

1. Field of the Invention

The present invention relates to an abnormality detection device of a fuel pump for a water jet propulsion boat propelled by ejecting water drawn through a jet pump that is driven by an engine using a fuel which is pumped from a fuel tank by operation of the fuel pump.

2. Description of the Related Art

Some water jet propulsion boats are equipped with an apparatus detecting the abnormality occurred in a fuel system providing a fuel from a fuel tank to an engine (refer to JP-A-2002-161800, for example). This type of water jet propulsion unit has a fuel pressure sensor in a fuel piping connecting the fuel tank and the engine in order to detect the pressure of fuel running through the fuel piping. During the fuel pressure sensor detecting the pressure of the fuel running in the fuel piping, if the detected value becomes abnormal, it is determined that an abnormality has occurred in the fuel system, and then an action such as stopping the fuel pump operation is performed.

However, the conventional fuel pressure sensor described above for water jet propulsion boats is constituted by precision instruments typically including strain gauges and circuits for signal amplification or transformation, and is therefore structurally weak against vibrations. The fuel pressure sensor is often exposed to hard vibrations since the water jet propulsion boats are highly motile and plane in high speed on the wavy water surface. Therefore, the vibration forces on the water jet propulsion boat may cause an error to occur in the value detected by the fuel pressure sensor and also may damage the fuel pressure sensor.

In order to prevent such problems, an attachment of the fuel pressure sensor must be strongly built to protect the fuel pressure sensor from damage caused by the hard vibration. Also, the structure of the attachment must be designed to prevent the vibration from being transmitted to the fuel pressure sensor. The attachment needs to be removable so that the fuel pressure sensor can be exchanged easily in case of breakdown. For the above reasons, the use of the fuel pressure sensor as an abnormality detection device of the water jet propulsion unit leads to a high cost, an increase in the number of parts, an increase in man-hours required for the assembly process, limitation of layout and such. In addition to this, if the fuel pressure sensor were used as an abnormality detection device in a water jet propulsion boat and if the fuel pump sucked the air temporarily, which causes the decrease of the fuel pressure, the fuel pressure sensor may determine that the fuel pump operation is abnormal even if the fuel pump has been operating normally.

SUMMARY OF THE INVENTION

In order to overcome the problems described above, preferred embodiments of the present invention achieve cost reduction by the omission of the fuel pressure sensor and provide an abnormality detection device that is free from the detection error and breakdown.

A preferred embodiment of the present invention provides an abnormality detection device of a fuel pump for a water jet propulsion boat, the fuel pump being driven by an electric motor, and the boat being propelled by ejecting a water drawn through a water jet pump that is driven by an engine using a fuel pumped from a fuel tank, the abnormality detection device including: an abnormality detection circuit including a resistance disposed between the power supply side and the ground side of the electric motor for driving the fuel pump; a voltage detection unit arranged to detect the voltage value of the abnormality detection circuit; and a warning unit arranged to issue a warning if the voltage value detected by the voltage detection unit is larger than the upper limit of a normal range or smaller than the lower limit of the normal range.

The abnormality detection device according to a preferred embodiment of the present invention detects that an abnormality has occurred in the fuel pump not based on the detection of the fuel pressure by the fuel pressure sensor, but based on the detected voltage value of the electric motor during operation thereof, by using the simply structured abnormality detection circuit including the resistance. The abnormality detection circuit is hardly affected by vibration and not easily broken down, so the additional vibration protection for the abnormality detection circuit is not necessary and there is no need to worry about the replacement of the abnormality detection circuit.

If the fuel pressure sensor is used, the pressure detection portion of the fuel pressure sensor is required to be located within the fuel pipe. On the contrary, if the abnormality detection circuit is used, the abnormality detection circuit may be located anywhere. In this preferred embodiment of the present invention, the abnormality detection device detects the voltage of the electric motor itself equipped to the fuel pump, therefore does not make an incorrect determination to the fuel pump operation even when air has been sucked in the fuel pump. In this preferred embodiment of the present invention, the normal value means a predetermined range within which the electric motor operates normally.

In addition, the abnormality detection device of the fuel pump according to a preferred embodiment of the present invention is further characterized in that the fuel pump module is configured to include the fuel pump and the regulator for controlling the pressure of the fuel pumped from the fuel tank to the engine by the fuel pump, and that the abnormality detection circuit is contained in the fuel pump module. The fuel pump and the regulator are included in the fuel pump module, so the main portion of the abnormality detection device of the fuel pump can be downsized. The abnormality detection circuit is contained in the fuel pump module in which the fuel pump is also stored, so the wiring connecting the fuel pump and the abnormality detection circuit can be partially omitted or short-circuited.

In addition, the abnormality detection device according to a preferred embodiment of the present invention is further characterized in that the fuel pump module is assembled as an element of the fuel tank such that the abnormality detection circuit is located in the fuel tank. When the water jet propulsion boat is planning, the seawater can intrude into the engine room of the water jet propulsion boat according to the wave conditions of the water surface or overturning of the water jet propulsion boat can occur. In this case, if the abnormality detection circuit is located where it can be soaked in the seawater, the abnormality detection circuit can be corroded or damaged by the seawater. However, in preferred embodiments of the present invention, the abnormality detection circuit is housed in the fuel tank so that the abnormality detection circuit is surrounded by the fuel (including the evaporated fuel) at all times, therefore the abnormality detection circuit can be protected from corrosion or salt damage.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
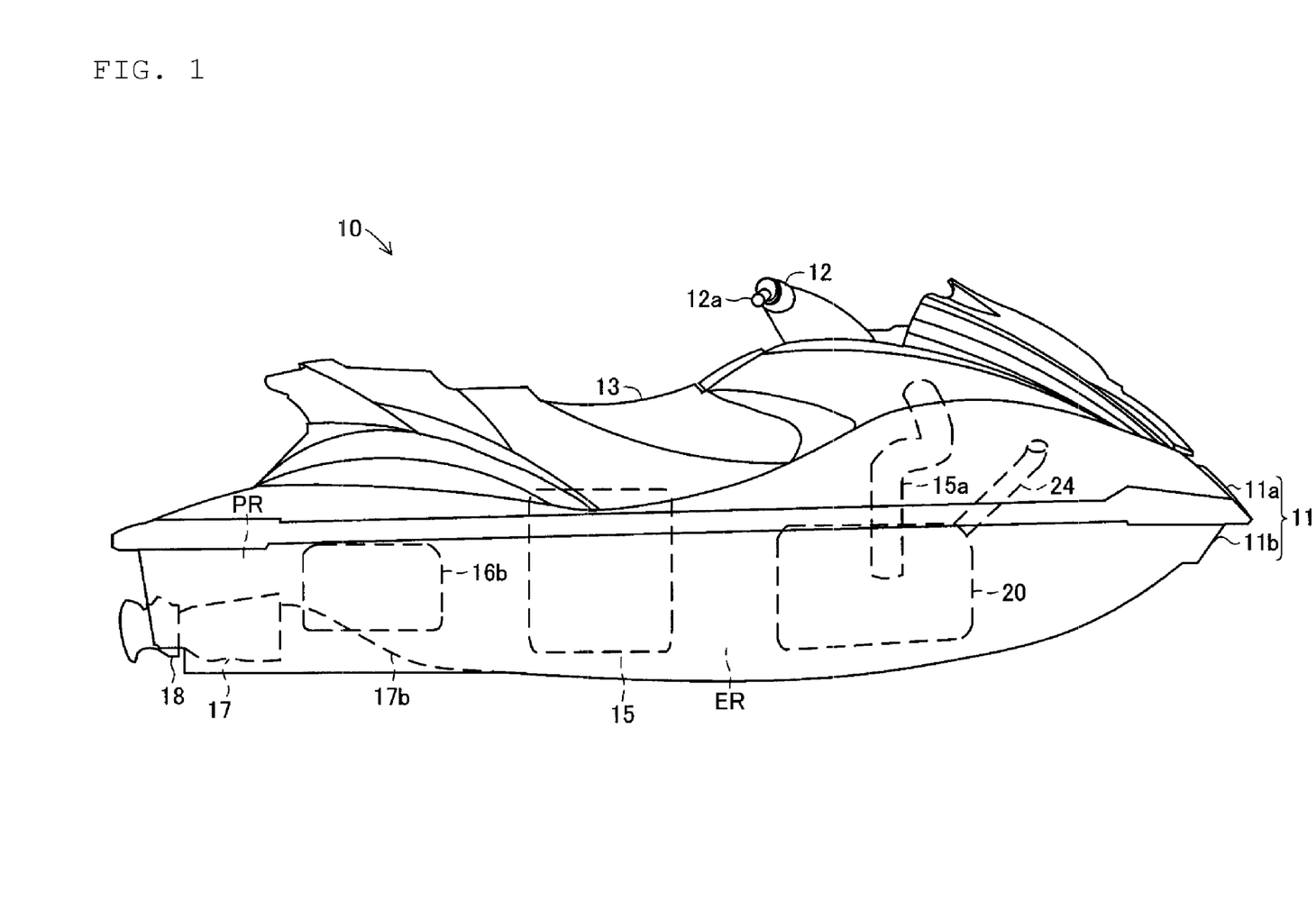
FIG. 1 is a side view of a water jet propulsion boat equipped with an abnormality detection device of a fuel pump according to a preferred embodiment of the present invention.
Figure 2:
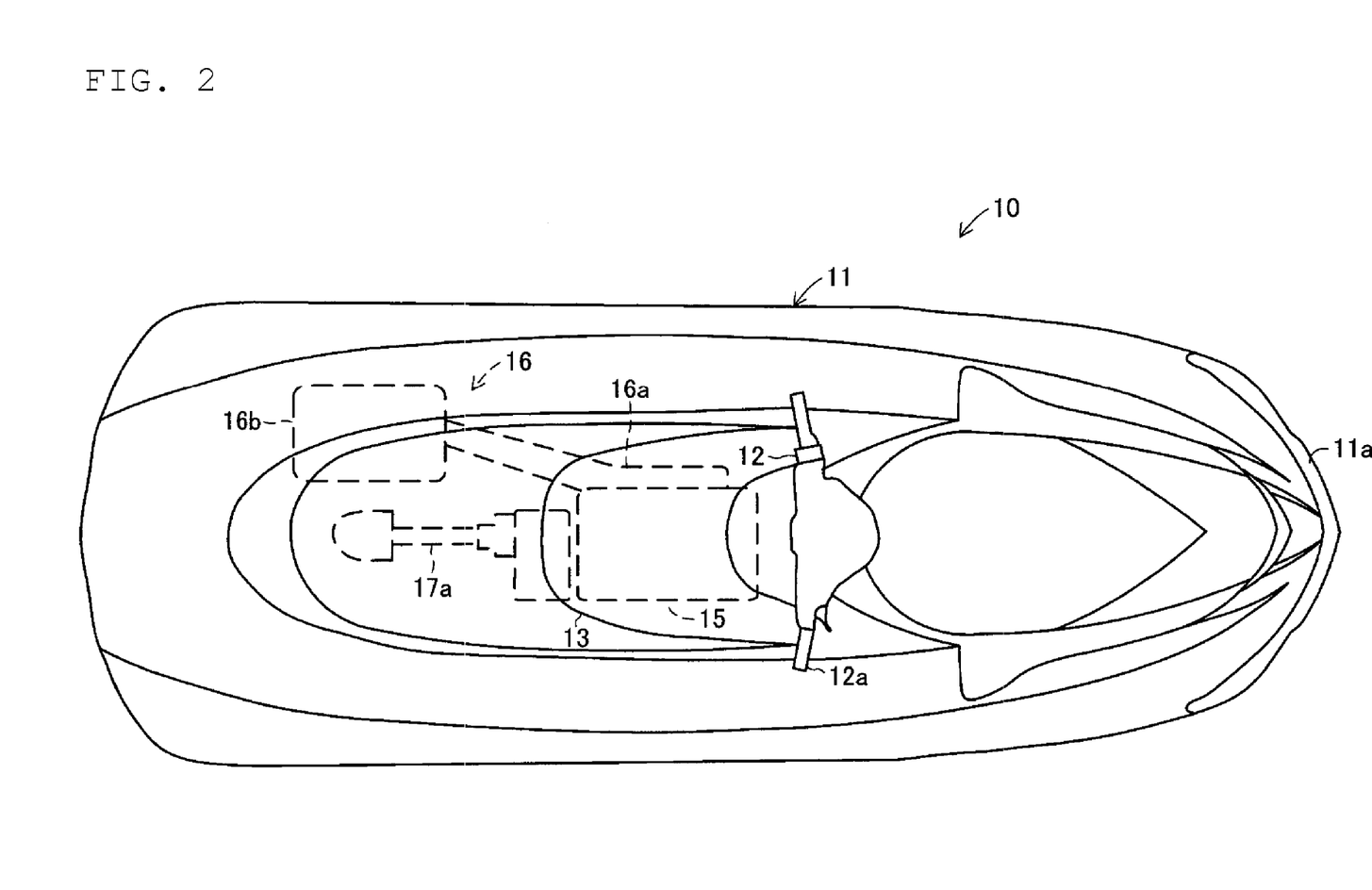
FIG. 2 is a plan view of the water jet propulsion boat shown in FIG. 1.

Preferred embodiments of the present invention are now described with reference to the drawings, in which FIG. 1 and FIG. 2 illustrate a water jet propulsion boat 10 equipped with an abnormality detection device 40 (see FIG. 7) of a fuel pump according to the present preferred embodiment. In this water jet propulsion boat 10, a boat body 11 includes a deck 11a and a hull 11b. Steering handlebars 12 are preferably disposed at a front and upper area of the boat body 11, and a seat 13 is preferably disposed at a center area of the boat body 11. The steering handlebars 12 are rotatably attached to the upper end of the steering shaft (not shown).

Figure 3:
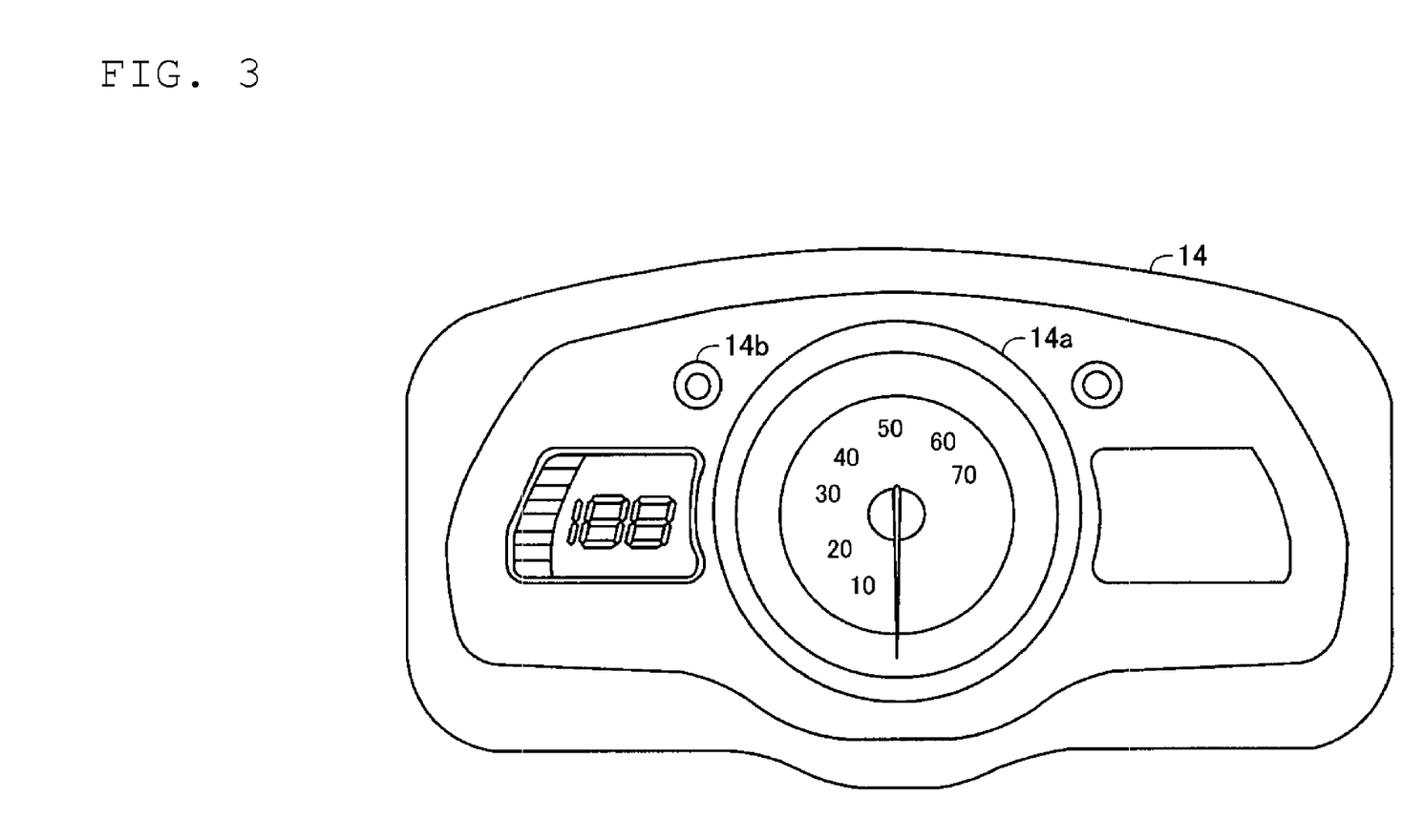
FIG. 3 is a front view of a meter.

A throttle lever (not shown) is disposed adjacent to a grip 12a on the right side (the starboard side) of the steering handlebars 12. The throttle lever is adapted to be pivotal toward the grip 12a when the boat operator operates the throttle lever, and pivotal apart from the grip 12a when the operator releases the throttle lever. An accelerator position sensor (not shown) for detecting the operation amount of the throttle lever is provided on the wire connected to the throttle lever. As shown in FIG. 3A, a meter 14 as a warning device according to a preferred embodiment of the present invention is disposed preferably at an approximate center of the steering handlebars 12. The meter 14 includes display sections such as speedometer 14a to indicate the running speed of the water jet propulsion boat 10 and a warning lamp 14b of LED. The meter 14 also preferably includes a buzzer (not shown) or the like to generate a warning sound.

The interior of the boat body 11 is made up of an engine room ER that extends from its front portion to central portion, and a pump room PR located at its rear portion. The engine room ER is provided with a fuel tank 20, an engine 15, an intake system (not shown) constituted with a throttle valve, etc., an exhaust system 16 constituted with an exhaust manifold 16a, etc. The pump room PR is provided with a propulsion unit 17 including a jet pump, etc. An air duct 15a to introduce the external air into the engine room is disposed in the front portion of the engine room ER. The air duct 15a extends vertically from the upper portion of the boat body 11 to the bottom portion of the engine room ER and sucks the external air from the upper end of the air duct 15a and introduces it into the bottom end then to the engine room ER.

Figure 4:
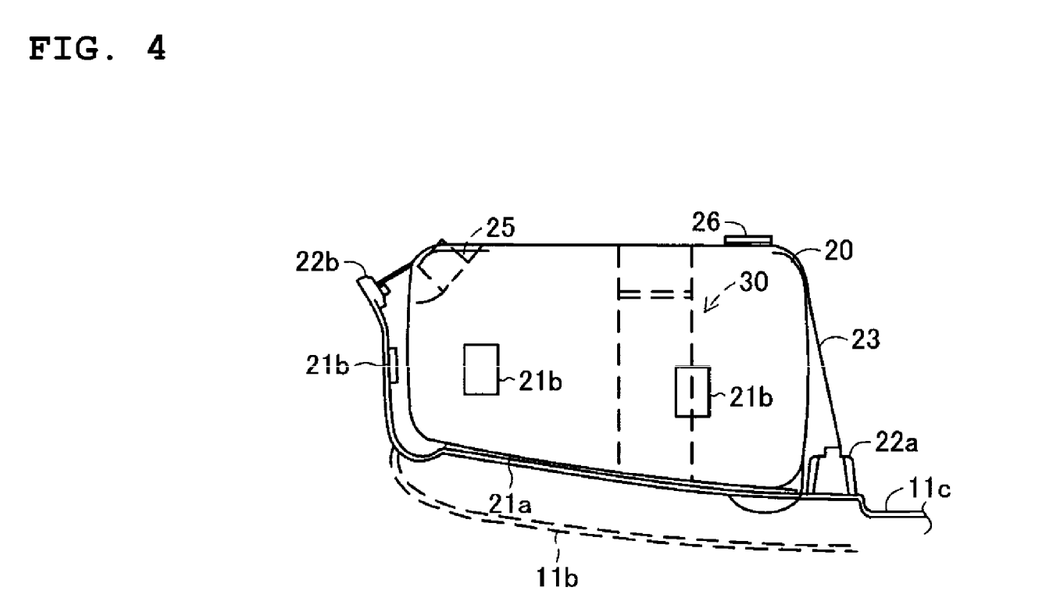
FIG. 4 is a cross sectional view of a mount structure as seen from the side.
Figure 5:
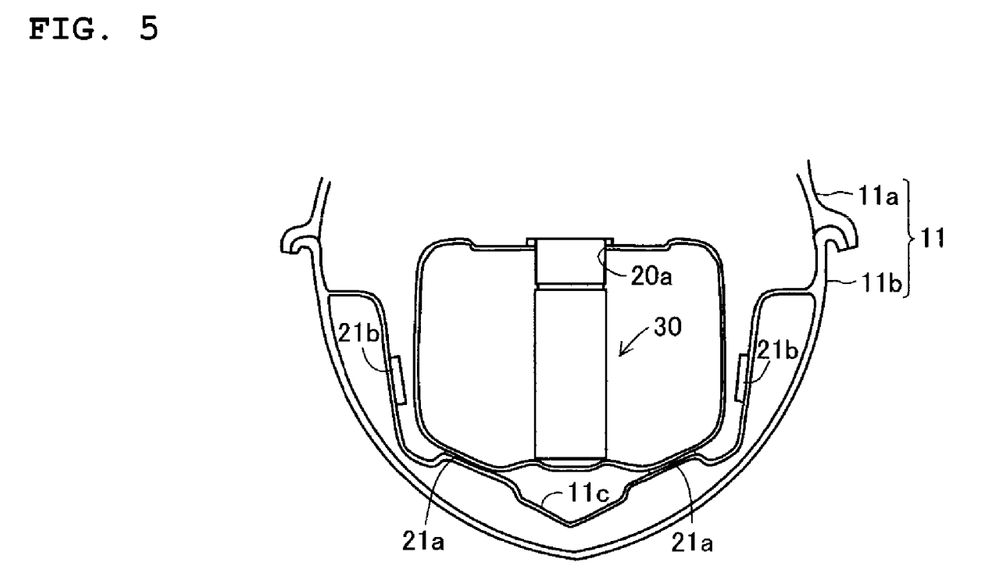
FIG. 5 is a cross sectional view of the mount structure as seen from the front.

The fuel tank 20 is disposed at the front portion of the engine room ER as shown in FIGS. 4 and 5. The hull 11b constituting the bottom portion of the boat body 11 has a dual structure, in which the fuel tank 20 is mounted, through a plurality of vibration absorbing members 21a, 21b, on an inner wall 11c constituting the inner structure of the hull 11b. The vibration absorbing members 21a are preferably disposed in two places on both sides supporting the bottom of the fuel tank 20 on the bottom surface of the inner wall 11c, for example. On the other hand, the vibration absorbing members 21b are preferably disposed in three places that face to the side surfaces of the inner wall 11c other than the side surface rear of the fuel tank 20, for example. A fastening hardware 22a is fixed on the inner wall 11c where the bottom rear end of the fuel tank 20 is located. Another fastening hardware 22b is fixed on the inner wall 11c (hull 11b) where the upper front end of the fuel tank 20 is located.

The belt 23 is wound around the fuel tank 20 through the fastening hardware 22a and 22b, so the upper surface of the fuel tank 20 is pressed down against the bottom wall 11c. In this way, the fuel tank 20 is supported by the inner wall 11c, accordingly the vibration of the boat body 11 is absorbed by the vibration absorbing members 21a. Therefore, vibrations are not transmitted directly to the fuel tank 20. Even if the fuel tank 20 deviates horizontally, the impact from the inner wall 11c on the side surface of the fuel tank 20 can be absorbed by the vibration absorbing members 21b.

The fuel tank 20 preferably is a generally rectangular-shaped-container including a bottom wall. The bottom wall is preferably arranged to be inclined such that the front portion of the bottom wall is higher than the rear portion of the bottom wall. An opening 20a is formed in the top wall of the fuel tank 20, centrally in the left-right direction and rather rearward thereof. A connecting opening 25, which is in fluid communication with an oil feed pipe 24 extending from an oil fuel inlet formed in the deck 11a, is formed in the upper front end of the fuel tank 20. An opening that can be opened and closed with a lid 26 is formed in the upper rear end of the fuel tank 20. A fuel pump module 30 is disposed in the fuel tank 20 with its upper surface being exposed through the opening 20a.

Figure 6:
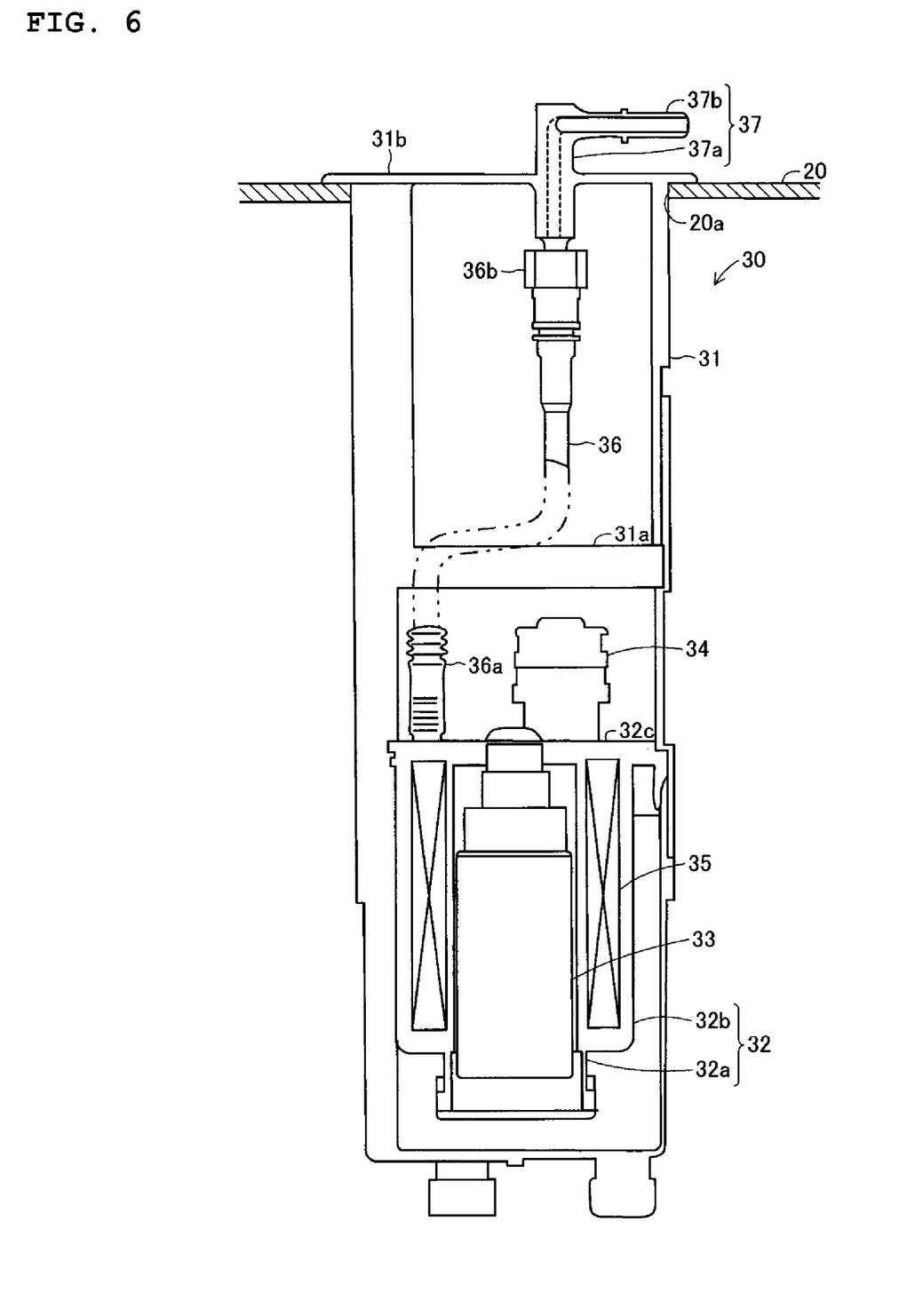
FIG. 6 is a cross sectional view of a fuel pump module.

As shown FIG. 6, the fuel pump module 30 is constituted by dividing an elongated cylindrical container 31 into an upper room and a lower room with a partition 31a. A fuel pump 33, a regulator 34, and a filter 35 are housed in the upper room via a housing 32 in the lower room. A connecting pipe 36 is provided. The housing 32 includes a pump housing section 32a to contain the fuel pump 33 and a case member having a filter housing section 32b to contain the filter 35. A cylindrical pump housing section 32a is formed at the center of the housing 32. An annular filter housing section 32b is disposed around the outer surfaces of the pump housing section 32a except for the bottom surface.

A suction port (not shown) arranged to suck the fuel into the fuel pump 33 from the fuel tank 20 by operation of the fuel pump 33 extends from the bottom surface of the container 31 to the upper surface of the bottom wall of the pump housing section 32a. A discharge port (not shown) arranged to discharge the fuel sucked in the pump housing section 32a through the fuel pump 33 is disposed between the upper portion of the pump housing section 32a and the filter housing section 32b. The fuel pump 33 housed in the pump housing section 32a is, as shown FIG. 7, includes a fuel pump motor 33a as an electric motor and an abnormality detection circuit 33b including a resistance according to a preferred embodiment of the present invention.

The fuel pump 33 draws the fuel, by operation of the fuel pump motor 33a, from the fuel tank 20 into the pump housing section 32a and then discharges into the filter housing section 32b. The abnormality detection circuit 33b is used to detect a condition of the fuel pump 33 to determine if the fuel pump 33b is working normally. A regulator 34 is disposed in a position on the upper surface 32c of the container 32, corresponding to the rear portion (right side in FIG. 6) of the housing section 32a. The regulator 34 is in communication with the inside of the pump housing section 32a. The regulator 34 controls the pressure of the fuel, which is drawn into the pump housing section 32a by the fuel pump 33, to be even.

A grommet 36a is disposed in a position on the upper surface 32c of the housing 32, corresponding to the front portion (left side in FIG. 6) of the filter housing section 32b. The grommet 36a is in communication with the inside of the filter housing section 32b. The bottom end of the connecting pipe 36 is connected to the grommet 36a. The connecting pipe 36 extends through the partition 31a into the upper room of the container 31. A check valve 36b is disposed at the upper end of the connecting pipe 36. The connecting pipe is connected, through the check valve 36b, to a fuel discharge section 37 formed on the top wall 31b of the container 31. The fuel discharge section 37 is constituted by a body portion 37a and a connecting portion 37b. The body portion 37a extends from the inside of the container 31 to the outside through the upper wall 31b of the container 31. The connecting portion 37b bends at the upper end of the body portion 37a and then extends horizontally rearward. The upper stream end of the fuel piping (not shown) extending toward the engine 15 is connected to the connecting portion 37b.

Therefore, when the fuel pump 33 is operated, the fuel in the fuel tank 20 is drawn from the suction port through the fuel pump 33 into the pump housing section 32a and then discharged into the filter housing section 32b. At the same time, the fuel pressure is controlled to be even by the regulator 34 disposed in the vicinity of the discharge port. The fuel discharged in the filter housing section 32b is filtered by the filter 35 in order to remove foreign matters and then drawn into the engine 15 through the connecting pipe 36 and the fuel piping etc. The fuel is fed towards the engine 15 from the connecting pipe 36 through the fuel discharge section 37. The backflow of the fuel is prevented by the check valve 36b.

The engine 15 is preferably disposed at the rear portion of the engine room ER (center of the bottom in the boat body 11). An intake device and an exhaust device 16 are connected to the engine 15. The intake device feeds a mixture to the engine. The mixture includes the fuel supplied from the fuel tank 20 and the air taken from the outside. The exhaust device 16 releases the exhaust gas discharged from the engine 15 to the outside through a rear end portion of the boat body 11. Although not shown, the engine 15 preferably is a four-stroke-four-cylinder engine, for example. Each cylinder is preferably provided with an intake valve and an exhaust valve. As the intake and exhaust valves are selectively opened and closed, the mixture of fuel and air is taken into the engine 15 from the intake system on the intake valve side, and an exhaust gas is delivered to the exhaust system 16 on the exhaust valve side.

At this time, the mixture supplied into the engine 15 from the intake valve explodes with the ignition of the ignition device of the engine 15. This explosion causes a piston in each cylinder of the engine 15 to move in a reciprocal manner. The motion of the piston rotates a crankshaft. The crankshaft is coupled with an impeller shaft 17a. The crankshaft transmits the rotational force of the engine 15 to the impeller shaft 17a for rotation. Also, the rear end portion of the impeller shaft 17a is coupled with an impeller (not shown) of the propulsion unit 17 that is mounted at the rear end of the boat body 11. The rotation of the impeller generates a propulsive force in the water jet propulsion boat 10.

The propulsion unit 17 has a water inlet port 17b that opens at the bottom of the boat body 11 and a water outlet port (not shown) that opens at the stern. The propulsion unit 17 introduces seawater from the water inlet port 17b, and ejects it from the water outlet port by the rotation of the impeller to generate the propulsive force for the boat body 11. A steering nozzle 18 is attached to the rear end of the propulsion unit 17. The rear portion of the steering nozzle 18 is rotatable in the left or right direction. The advancing direction of the water jet propulsion boat 10 is controlled by the operation of the steering handlebars 12.

The intake system includes intake pipes connected to the engine 15, throttle bodies connected to the intake pipes, and other components. The intake system sucks air from the outside through an intake box (not shown) and the like, adjusts the air flow by the opening or closing operation of a throttle valve disposed in the throttle body, and then supplies the air to the engine 15. The adjustment of the throttle valve opening is made by the rotating operation of the throttle lever disposed on the steering handlebars 12. At the same time, the fuel is mixed with the air to be supplied to the engine 15.

The exhaust system 16 includes an exhaust manifold 16a, a tank-like water lock 16b, or the like. The exhaust manifold 16a preferably includes curved pipes connected to the engine 15. The water lock 16b is connected to the rear end of the exhaust manifold 16a. An exhaust pipe is disposed on the upper surface of the rear portion of the water lock 16b. The exhaust pipe once extends upward, then downward and rearward, and then opens at the rear end lower portion of the boat body 11. The exhaust system 16 discharges the exhaust gas externally under the condition that external seawater or the like is prevented from entering the engine 15 side.

Figure 7:
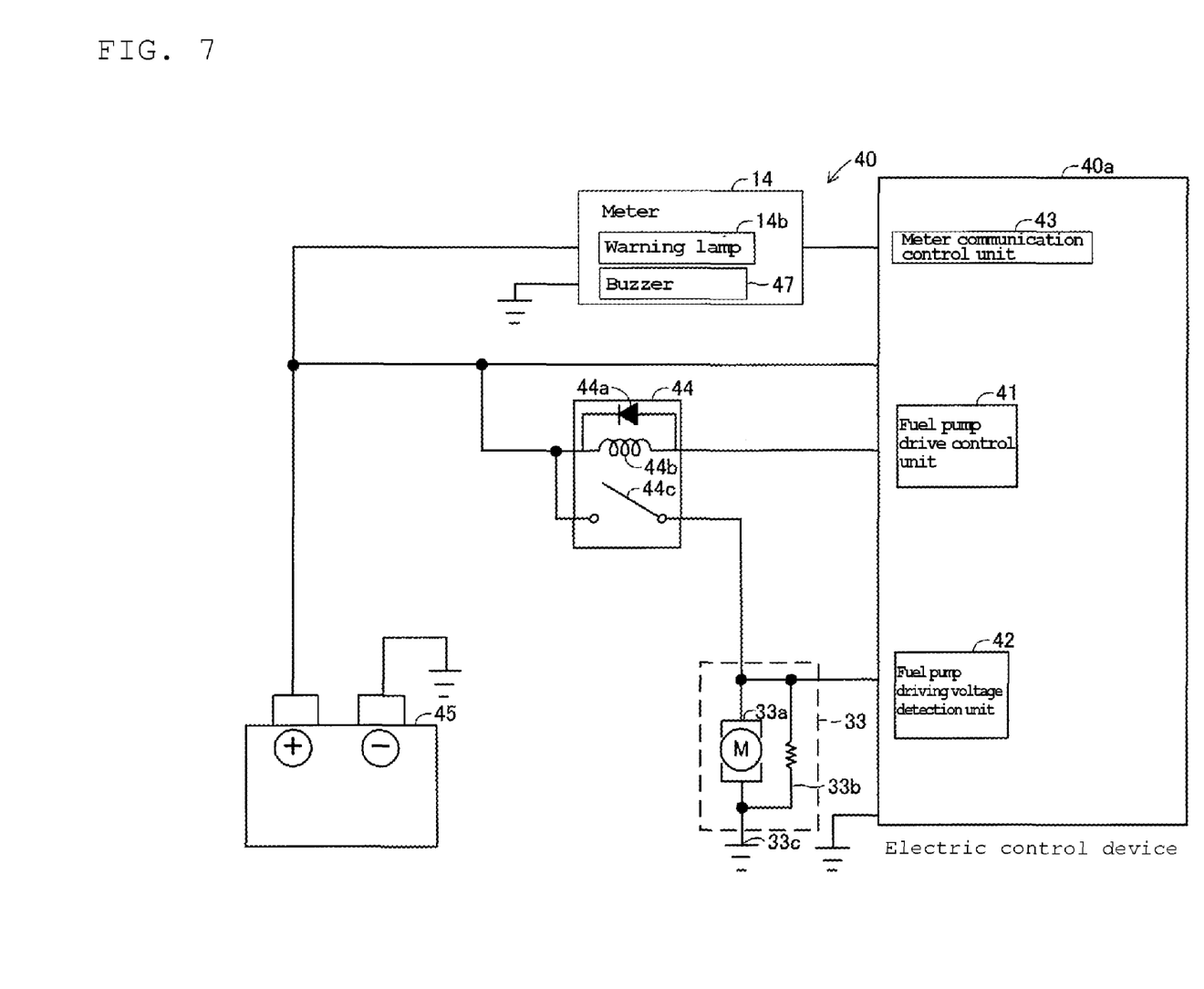
FIG. 7 is a schematic diagram of devices for detecting the driving voltage of the fuel pump.

As shown in FIG. 7, in addition to the already mentioned devices, the abnormality detection device 40 of the fuel pump according to a preferred embodiment preferably further includes: an electric control device 40a including a fuel pump drive control unit 41; a fuel pump driving voltage detection unit 42 as a voltage detection device according to a preferred embodiment of the present invention and a meter communication control unit 43; a fuel pump relay 44; a battery 45; a buzzer 47 equipped to a meter 14; and various switches such as a start switch; and sensors and other devices that are necessary for operating the water jet propulsion boat 10. The electric control device 40a preferably includes a CPU, ROM, RAM, and timer or the like. The fuel pump drive control unit 41 and the fuel pump driving voltage detection unit 42 function to perform a certain part of each program executed by the CPU. The meter communication control unit 43 transmits the command data such as a warning lamp 14b ON, a buzzer 47 ON, or the like, based on the data detected by the fuel pump driving voltage detection unit 42.

The accelerator position sensor, the meter 14, the fuel pump relay 44, and the battery 45 are respectively connected to the electric control device 40a through a lead wire. The fuel pump 33 is connected to the electric control device 40a through a lead wire and the fuel pump relay 44. The abnormality detection circuit 33b disposed on the fuel pump motor 33a of the fuel pump 33 is connected to the electric control device 40a through a lead wire. The electric current flowing in the abnormality detection circuit 33b is transmitted as a signal to the fuel pump driving voltage detection unit 42 when the fuel pump motor 33a is driven. The fuel pump driving voltage detection unit 42 calculates the driving voltage of the fuel pump 33 based on the signal and resistance value of the resistance.

The abnormality detection circuit 33b is disposed between the fuel pump relay 44 (battery 45) side and the ground 33c side of the fuel pump motor 33a. Therefore, the electric current flowing in the fuel pump 33 is branched to the fuel pump motor 33a and the abnormality detection circuit 33b. When the fuel pump motor 33a is in operation, the electric current flowing in the abnormality detection circuit 33b is decreased and varied within a predetermined normal range. The voltage value calculated by the fuel pump driving voltage detection unit 42 is proportional to the electric current, so the determination of whether the fuel pump motor 33a (fuel pump 33) is working normally can be made based on the voltage value of the abnormality detection circuit 33b.

The fuel pump drive control unit 41 controls the performance of the fuel pump relay 44 based on the calculation of the fuel pump driving voltage detection unit 42. The fuel pump relay 44 includes a diode 44a, a coil 44b, and a contact 44c. When a predetermined electric current flows in the coil 44b, the contact 44c closes, and then the fuel pump motor 33a connected to the contact 44c starts to rotate. When the electric current to the coil 44b stops, the contact 44c opens and the fuel pump motor 33a stops. The diode 44a absorbs the counter electromotive force generated at the ON or OFF operation of the contact 44c.

Figure 8:
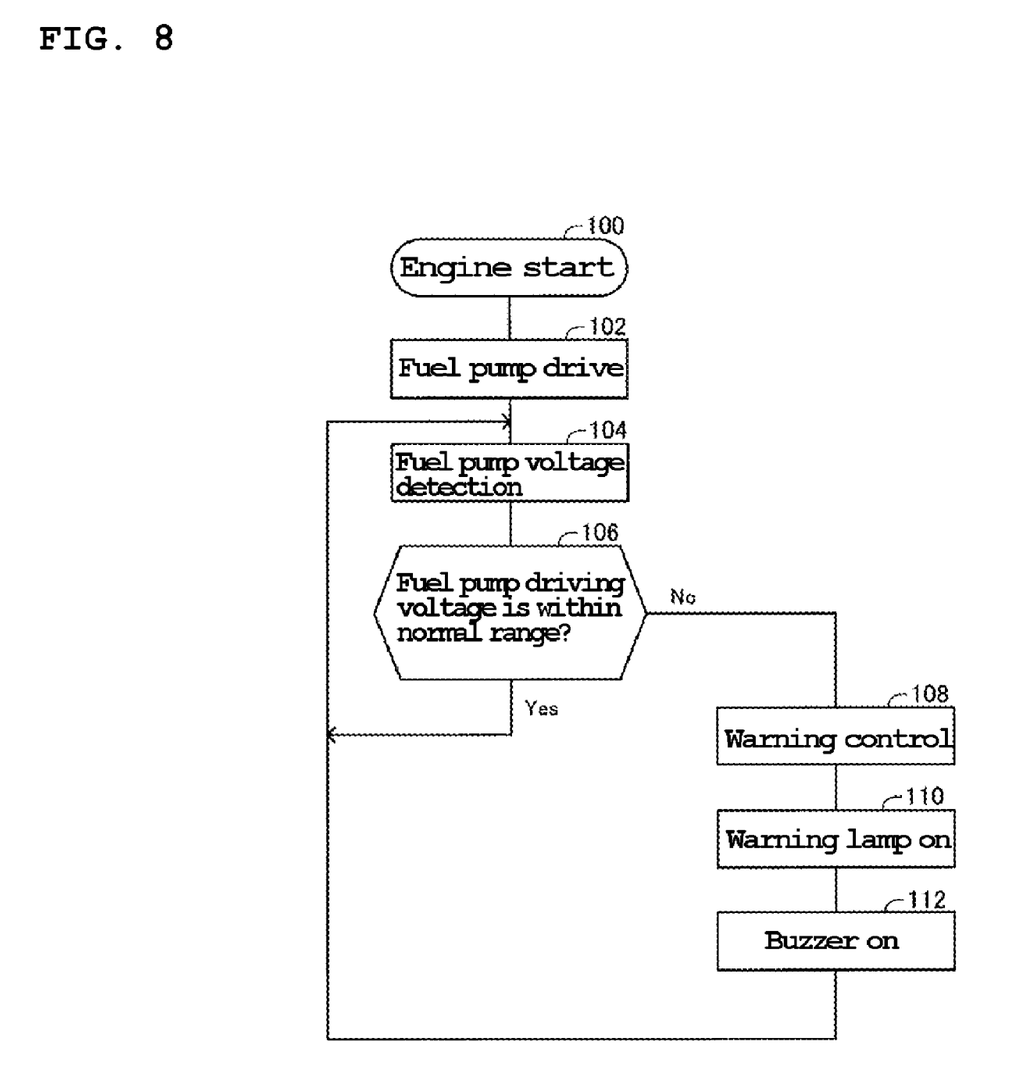
FIG. 8 is a flow chart of a program performing the detection of the driving voltage of the fuel pump.

The fuel pump 33 starts or stops based on the control by the fuel pump drive control unit 41 according to the programs in the ROM or the data in the RAM. In the present preferred embodiment of the present invention, the data stored in the RAM is, for example, the drive voltage range in which the fuel pump motor 33a operates normally. The program shown in FIG. 8 is stored in the ROM. According to this program, the meter communication control unit 43 transmits command data to the meter 14 if the drive voltage value detected by the fuel pump driving voltage detection unit 42 is out of the normal range as a result of an abnormality occurring in the fuel pump 33. Then, the warning lamp 14b flashes, and the buzzer 47 generates an alarm sound.

When the start switch is turned on, the engine starts and the water jet propulsion boat constituted in the above way is ready to run. When the operator straddling the seat 13 operates the steering handlebars 12 and a throttle lever, the water jet propulsion boat 10 starts running in the advancing direction and at the speed each corresponding to the respective operations by the operator. The engine 15 is operated through the throttle valve by the control of the electric control device 40a according to the operation amount of the throttle lever detected by the accelerator position sensor. In the driving state, the drive voltage of the fuel pump 33 is detected by the fuel pump driving voltage detection unit 42 through the abnormality detection circuit 33b attached on the fuel pump motor 33a. If the abnormality in the voltage is detected, an alarm is set off according to the program shown in FIG. 8.

That is, the program is started in the step 100, then proceeds to the step 102 when the engine 15 starts, and then actuates the fuel pump 33 by starting the fuel pump motor 33a. Following this, the fuel in the fuel tank 20 is sucked in the fuel pump 33, then foreign matters are removed by the filter 35, and then the fuel is provided to the engine 15 through the fuel piping 36 and the like. Next, the driving voltage value of the fuel pump 33 is detected in the step 104. This detection is performed by calculating the voltage based on and electric current flowing in the abnormality detection circuit 33b and the resistance value of the resistance.

The step 106 determines if the driving voltage of the fuel pump 33 is within the normal range, in other words, if the driving voltage of the fuel pump 33 driving normally is smaller than the upper limit of the normal value range and larger than the lower limit of the normal value range. If the fuel pump 33 works normally and the driving voltage is within the normal value range, the step 106 determines the result as "Yes," then the program proceeds to the step 104. If the result in the step 106 is determined "Yes," the fuel pump 33 continues the driving, then the fuel pump drive control unit 41 and the fuel pump driving voltage detection unit 42 perform the steps 104 and 106 repeatedly.

If the result in the step 106 is determined "No," that is, the operation of the fuel pump 33 is abnormal and the driving voltage value of the fuel pump 33 detected by the fuel pump driving voltage detection unit 42 is out of the normal range, the program proceeds to step 108. The step 108 performs the process to set off a warning, in other words the process for the meter communication control unit 43 to transmit the command data to the meter 14. The warning lamp 14b flashes in the step 110, and the buzzer 47 generates the alarm sound in the step 112. The program then proceeds to the step 104, and the processes in the steps 104 to 112 are repeated until the engine 15 is stopped.

As mentioned above, the abnormality detection device 40 of the fuel pump of the present preferred embodiment is adapted to detect the voltage of the fuel pump motor 33a of the fuel pump 33 for detection of the abnormality of the fuel pump 33. The detection is performed by using the abnormality detection circuit 33b that includes the resistance. The abnormality detection circuit 33b does not easily suffer from or become affected by the vibration. Therefore, the special protective measures to protect the abnormality detection circuit 33b from the vibration are unnecessary. Moreover, a replacement of the abnormality detection circuit 33b is almost unnecessary. The abnormality detection device detects the voltage of the fuel pump motor 33a of the fuel pump 33. Therefore, the detection device does not fail to determine the drive of the fuel pump 33 as abnormal even if the air is sucked in the fuel pump 33.

The fuel pump 33 and the regulator 34 are preferably provided in the fuel pump module 30. The abnormality detection circuit 33b is preferably included in the fuel pump 33. Therefore, the main portion of the abnormality detection device 40 of the fuel pump can be downsized. The abnormality detection circuit 33b is provided in the fuel pump 33, and the lead wire connecting the fuel pump motor 33a and the abnormality detection circuit 33b can be therefore partly omitted or short-circuited. Moreover, the fuel pump module 30 is preferably assembled to be an element of the fuel tank 20, such that the fuel pump 33 including the abnormality detection circuit 33b is located in the fuel tank 20. Therefore, if the water propulsion boat 10 is overturned and water intrudes into the engine room ER, the abnormality detection circuit 33b can be protected from the corrosion or salt damage since the abnormality detection circuit 33b is soaked in the fuel bath at all times.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An abnormality detection device of a fuel pump for a jet propulsion boat, the fuel pump being driven by an electric motor, and the boat being propelled by ejecting water drawn through a water jet pump that is driven by an engine using a fuel pumped from a fuel tank by operation of the fuel pump, the abnormality detecting device comprising:

an abnormality detection circuit including a resistance disposed between a power supply side of the electric motor and a ground side of the electric motor, the resistance arranged in the abnormality detection circuit to be in parallel with the electric motor when the electric motor is provided with electric current from a power supply;

a voltage detection unit arranged to detect a voltage value of the abnormality detection circuit; and a warning unit arranged to issue a warning when the voltage value detected by the voltage detection unit is larger than an upper limit of a normal range or smaller than a lower limit of the normal range.

2. The abnormality detection device of the fuel pump according to claim 1, wherein a fuel pump module includes the fuel pump, and a fuel pressure regulator arranged to control a pressure of the fuel pumped from the fuel tank to the engine by operation of the fuel pump, and the abnormality detection circuit is disposed in the fuel pump module.

3. The abnormality detection device of the fuel pump according to claim 2, wherein the fuel pump module is included as an element of the fuel tank and the abnormality detection circuit is located in the fuel tank.

* * * * *